Sept. 9, 1969

D. H. RING 3,466,111

OPTICAL BEAM REDIRECTOR

Filed Dec. 29, 1966

INVENTOR
*D. H. RING*
BY
*Sylvan Sherman*
ATTORNEY

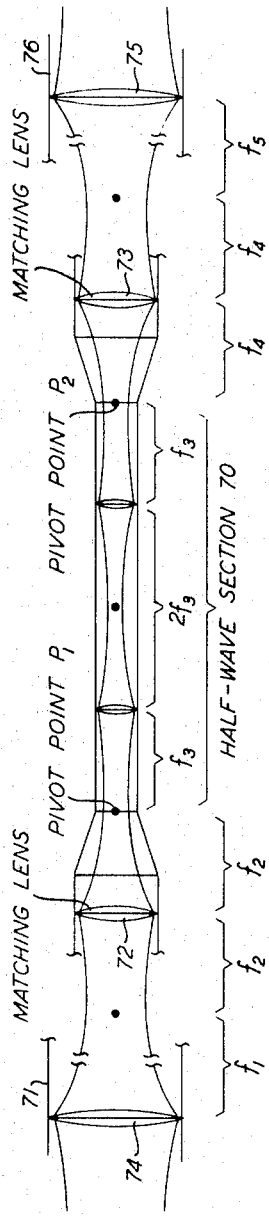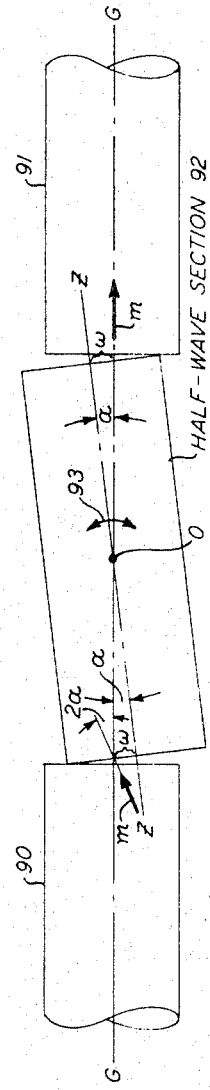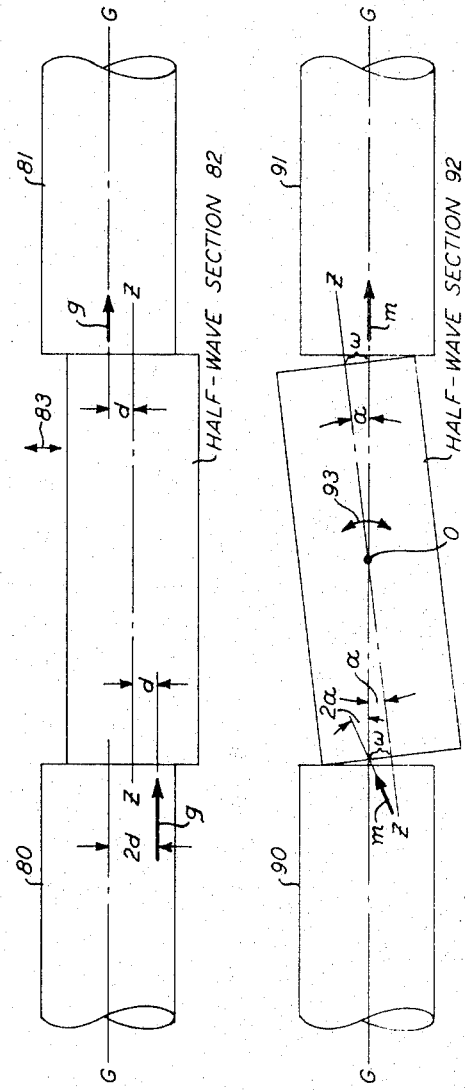
FIG. 7
FIG. 8
FIG. 9

Sept. 9, 1969                  D. H. RING                  3,466,111
OPTICAL BEAM REDIRECTOR
Filed Dec. 29, 1966                                5 Sheets-Sheet 4
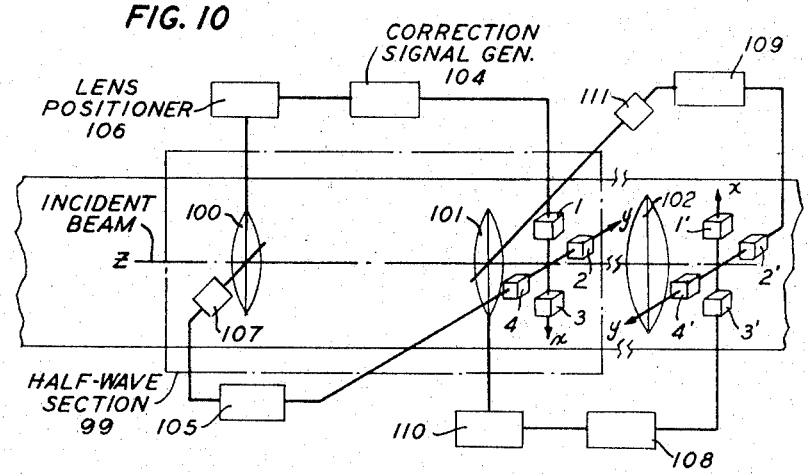
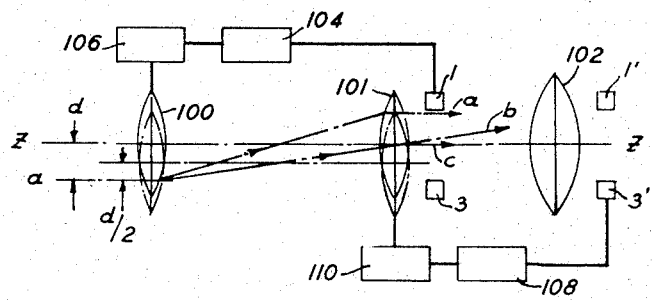
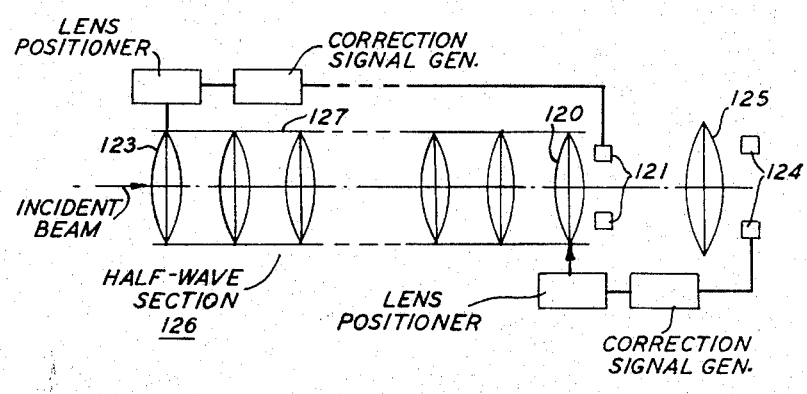

United States Patent Office 3,466,111
Patented Sept. 9, 1969

3,466,111
OPTICAL BEAM REDIRECTOR
Douglas H. Ring, River Plaza, N.J., assignor to Bell Telephone Laboratories, Incorporated, Murray Hill, Berkeley Heights, N.J., a corporation of New York
Filed Dec. 29, 1966, Ser. No. 605,741
Int. Cl. G02b 27/00
U.S. Cl. 350—54      7 Claims

ABSTRACT OF THE DISCLOSURE

Apparatus for redirecting an optical beam. When an off axis ray traverses a sequence of equally spaced, identical lenses whose centers lie along a common axis, it traces a path which oscillates about the axis with a periodicity that can be measured in terms of the number of lenses traversed. Of particular interest to the problems of redirecting an optical beam are the properties of a lens system equivalent to one-half a ray displacement cycle, or a half-wave section. In particular, it is shown that complete beam control can be realized by rotating and translating a half-wave section of lenses.

---

This invention relates to adjustable lens systems for reorienting an optical beam.

The advent of the optical maser, or laser, with the attendant availability of substantially single frequency, coherent wave energy in the optical frequency range, has made feasible communication by means of modulated optical beams.

Various arrangements, employing lenses of both the gaseous variety and the solid variety, have been proposed for guiding optical wave energy over long distances. Such wave-guiding systems, however, have certain practical limitations which have been recognized, and which require rectification if these systems are to become commercially attractive. One of these limitations relates to the deviation in the direction of propagation of the optical beam due to misalignment of the optical waveguide as a result of intentional bends and unintentional bends resulting from manufacturing and construction tolerances. Accordingly, in any practical system, means must be provided to compensate for this deviation. Typically, information as to the nature of the compensation required is provided by optical sensing elements distributed about the wavepath. These elements monitor the direction of propagation of the optical beam and generate correcting signals which are then coupled to suitable control means which effect the necessary change in the beam direction.

In the copending application of E. A. J. Marcatili, Ser. No. 487,677, filed Sept. 16, 1964, and assigned to applicant's assignee, means are described for introducing auxiliary density gradients in a gaseous waveguiding medium as a means of redirecting an optical beam. In the copending application by D. C. Gloge, Ser. No. 600,565, filed Dec. 9, 1966, an arrangement for redirecting an optical beam guided by solid lenses is described.

In both of these copending applications, the waveguiding lenses themselves are manipulated to correct the beam direction. These systems contemplate that most, if not all, of the lenses along the waveguide be adapted for this purpose.

The present invention, on the other hand, contemplates the use of a separate, standard correcting section that can be inserted anywhere within the waveguiding system, as required, thus providing control means that are independent of the waveguiding lenses.

A beam redirector, in accordance with a preferred embodiment of the invention, comprises a sequence of $n$ lenses whose centers lie along a common axis. By appropriately selecting the lens-to-lens spacings, the focal lengths of the lenses, and the number of lenses, a so-called "half-wave section" is obtained. Such a section is characterized by two properties of particular interest to the problem of beam guidance. These properties relate to the manner in which a ray is translated and independently rotated as it traverses the system. In particular, a ray displaced a distance to one side of the common axis is displaced an equal distance to the other side. In addition, a ray incident at an angle to the axis is rotated through twice that angle, and leaves the system at minus the incident angle.

These properties of a half-wave section are utilized to redirect the optical beam. In one illustrative embodiment of the invention, a half-wave section is used as a means of negotiating a bend in an optical transmission system. In a second embodiment of the invention, a half-wave section is used to correct any error in the direction of propagation of an optical beam. In this latter application, beam-position sensors detect any misdirection in the beam and activate a feedback, or feedforward error-correcting circuit which makes the necessary corrections in the beam guidance system.

It is an advantage of the present invention that the half-wave section can be made as a standard item and inserted anywhere within an optical transmission path. Adjustable transformer lenses associated with the section are provided for beam matching purposes where required.

These and other objects and advantages, the nature of the present invention, and its various features, will appear more fully upon consideration of the various illustrative embodiments now to be described in detail in connection with the accompanying drawings, in which:

FIG. 1, included for purposes of explanation, shows a sequency of equally spaced, identical lenses;

Figure 4:
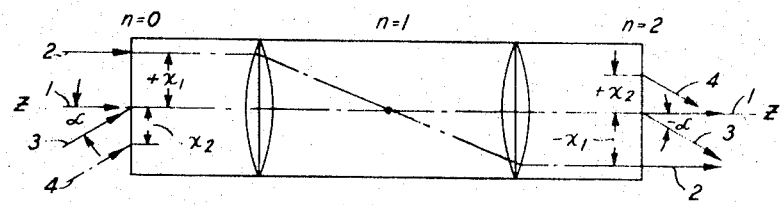
Figure 5:
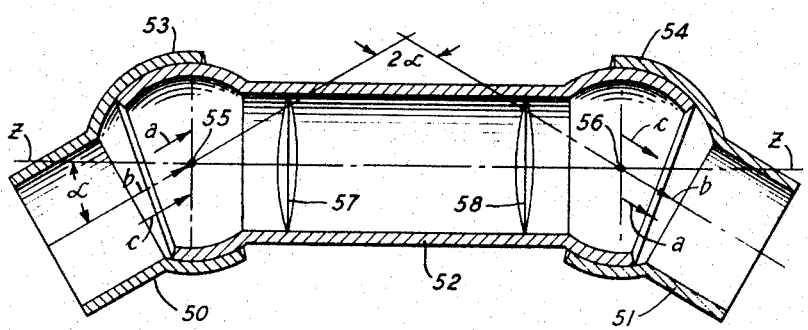
Figure 6:
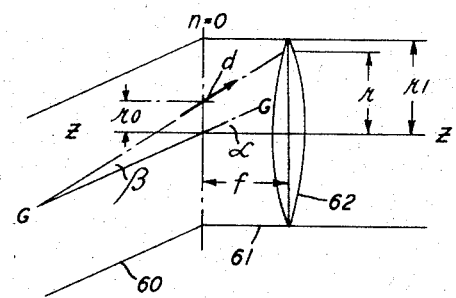
Figure 13:
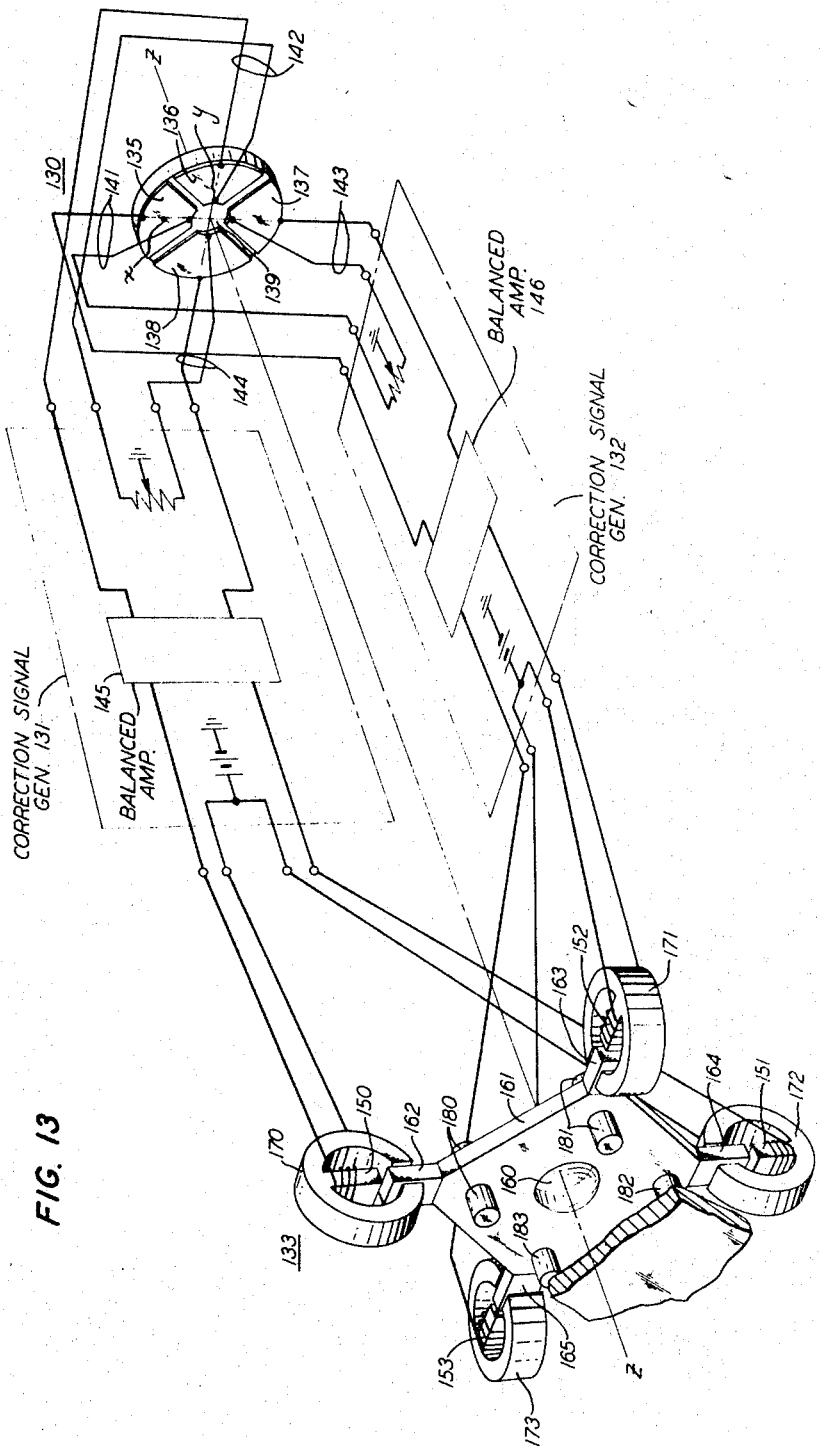

FIG. 4, included for purposes of explanation, shows the paths of different rays through a half-wave section;

FIG. 5 shows a first embodiment of the invention for redirecting an optical beam around a bend;

FIG. 6, included for purposes of explanation, shows the relationship between the orientation of a ray and the system parameters;

FIG. 7 shows a half-wave section and matching lens for coupling between a half-wave section and an optical waveguide of different size;

FIGS. 8 and 9 show the manner in which a half-wave section is used to redirect an optical beam along a waveguide;

FIG. 10 shows an active automatic control system for producing translation and rotation in a confocal half-wave section;

FIG. 11, included for purposes of explanation, illustrates the manner in which the embodiment of FIG. 10 operates;

FIG. 12 shows an active automatic control system for producing translation and rotation in a half-wave section having more than two lenses; and FIG. 13 shows in greater detail, a feedback circuit including a beam position sensor, two correction signal generators and a lens positioner.

Figure 1:
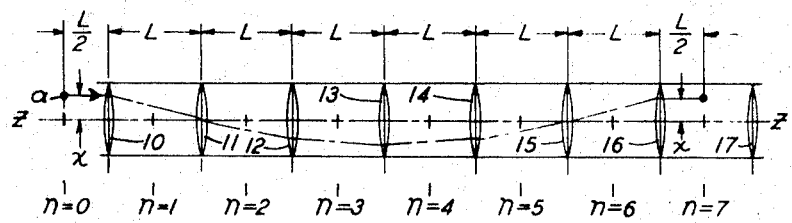

Referring to the drawings, FIG. 1 shows a sequence of equally spaced, identical lenses 10, 11, 12, 13, 14, 15, 16 and 17, whose centers lie along a common axis Z—Z. For purposes of explanation, the planes midway between adjacent lenses, and normal to the axis, are identified by the numerals zero through seven, starting with plane position $n=0$, located a distance $L/2$ in front of the first lens 10, and continuing to plane position $n=7$, located midway between lenses 16 and 17.

The direction of any beam can always be resolved into three mutually perpendicular components, designated $x$, $y$ and $z$, where $z$ is along the desired direction, and $x$ and $y$ are two transverse components indicative of the misdirection of the beam. Since each of these two components can be considered independently of each other, it is only necessary to discuss one of them. However, it is understood that any system would include sensing and control means for redirecting the beam along both the $x$ and the $y$ directions.

In general, an off-axis ray, entering the system at $n=0$, traces a path which oscillates about axis Z—Z with a periodicity that can be measured in terms of the number of lenses traversed. By the proper selection of the focal length $f$ of the lenses, and their spacing $L$, a ray can be made to traverse an integral number of lenses before it again assumes the same orientation it had when it entered the system. In this special case the product $n\theta$ is equal to $2\pi$ radians, where $n$ is the number of lenses, and $$\theta = \cos^{-1}\left(1 - \frac{L}{2f}\right) \quad (1)$$

The parameter $\theta$ represents that portion of the displacement cycle a ray undergoes as it progresses from one plane position, through a lens, to the next adjacent plane position.

In FIG. 1, a seven lens cycle is depicted. That is, ray $a$ entering the system at position $n=0$ in a direction parallel to the axis and displaced a distance $x$ above it, is again parallel to the axis and displaced the same distance $x$ above the axis at plane position $n=7$.

Figure 2:
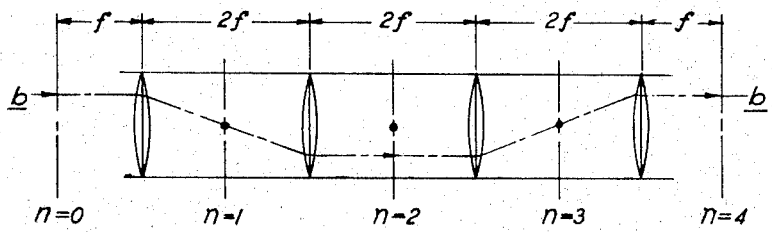
FIG. 2 shows a confocal arrangement of identical lenses.

In the special case where the lenses are confocally spaced (i.e., $L=2f$), $\theta$ is equal to $\pi/2$ radians. Thus, for confocally spaced lenses, a complete displacement cycle is achieved with only four lenses. This is illustrated in FIG. 2 wherein an off-axis ray $b$ is traced through a complete cycle in a confocal lens system.

Figure 3:
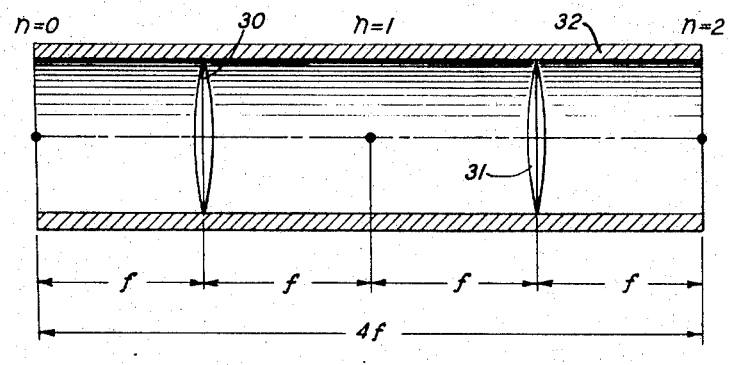
FIG. 3 shows a confocal half-wave section in accordance with the invention.

Of particular interest to the present invention are the properties of a system of lenses equivalent to one-half a ray displacement cycle (i.e., $n\theta = \pi$, or odd multiples of $\pi$). For purposes of the invention, a half displacement cycle can be achieved using any number of suitably spaced lens. However, in order to simplify the following discussion, the various illustrative embodiments to be described hereinbelow are implemented by means of a pair of confocally spaced lenses, as shown in FIG. 3.

This arrangement, to be referred to hereinafter as a "half-wave section," is the basic unit used in the various illustrative embodiments of the invention now to be described. For purposes of illustration, the section comprises a pair of similar lenses 30 and 31, of focal length $f$ disposed coaxially within an enclosure 32 of length $4f$. The lenses are confocally spaced from each other, and each lens is spaced a distance $f$ from an end of the enclosure.

More generally, as used in the discussion hereinafter, a preferred embodiment of a half-wave section shall be understood to consist of $n$ equally spaced, identical lenses such that the product $n\theta = \pi$, and shall be understood to have a physical length equal to $2fn$ which extends from a point $f$ units of length before the first lens to a point $f$ units of length beyond the last lens. It should be appreciated, however, that a half-wave section can also be made using a plurality of different lenses that are unequally spaced.

As indicated above, a ray traversing a half-wave section is displaced one-half of a displacement cycle. The consequences of this are illustrated in FIG. 4, which traces four different rays through the section. Each ray is examined at the input end of the half-wave section (plane position $n=0$) and again at the output end of the section (plane position $n=2$). The first of these rays, ray 1, is directed along the system axis Z—Z. Such a ray traverses the system unaffected. Ray 2, which enters the section parallel to axis Z—Z, but displaced a distance $x_1$ thereabove, leaves the system along a direction parallel to the axis but displaced an equal distance $x_1$ below the axis, for a total displacement of $2x_1$.

Rays 3 and 4, which enter the section at an angle $\alpha$ to the axis, are rotated through an angle $2\alpha$, and leave the section at an angle $-\alpha$ to the axis. In addition, ray 4, which enters displaced a distance $x_2$ below the axis at an angle $\alpha$, leaves displaced an equal distance $x_2$ above the axis at an angle $-\alpha$ for a total displacement of $2x_2$ and a total rotation of $2\alpha$.

To summarize, a half-wave section has the effect of translating a ray from one side of the optical axis an equal distance to the other side of the axis, and of independently rotating a ray that enters at an angle to the axis through twice that angle, so that it leaves the section at minus the incident angle.

The above-enumerated properties of a half-wave section are utilized to redirect optical beams. This includes redirection for the purpose of negotiating intentional bends in an optical transmission system, and redirection for the purpose of maintaining an optical beam on-axis, where there has been an unintentional misdirection of the beam.

FIG. 5 shows a first embodiment of the invention wherein the beam is directed about a bend in an optical transmission system comprising a first optical waveguide 50, a second optical waveguide 51 aligned with its axis at an angle $2\alpha$ to the first waveguide, and a half-wave section 52 disposed therebetween. Section 52 is oriented such that the axis Z—Z of the half-wave section intersects the axis of each of the waveguides at an angle $\alpha$. That is, section 52 is disposed such that the axes of the two waveguides pass through the focal points 55 and 56, respectively, of the two lenses 57 and 58 included in the half-wave section. As explained above, with respect to FIG. 4, a ray traversing a half cycle ray-displacement system at an angle to the system axis is rotated through twice said angle by the system. Accordingly, rays $a$, $b$ and $c$, entering section 52 in a direction parallel to the axis of waveguide 50, are rotated through an angle $2\alpha$, and leave section 52 in a direction parallel to the axis of waveguide 51. It is noted that there is an inversion of the beam in that each off-axis ray, $a$ and $c$, is also translated by section 52, as explained hereinabove, from one side of the axis Z—Z to the other side of the axis. However, this inversion does not produce any distortion in the beam.

A bend of the type described can be constructed as a fixed bend, or it can be adjustable, as illustrated in FIG. 5, wherein each waveguide connects to the half-wave section 52 by means of suitable flexible joints, such as the ball and socket joints 53 and 54 shown in the figure, which are adapted to pivot about focal points 55 and 56. In an adjustable arrangement, mechanical means are advantageously provided for maintaining equal angles between section 52 and each of the guides.

It is readily apparent from FIG. 5 that as the angle $\alpha$ is increased, a point is reached where some portion of the beam cannot negotiate the bend. The relationship between the orientation of a ray and the system parameters can be derived from the diagram given in FIG. 6, which shows an arbitrary ray $d$, inclined at an angle $\beta$ to the axis G—G of waveguide 60, entering a half-wave section 61 that is rotated $\alpha$ degrees relative to the waveguide. Ray $d$ is, in addition, displaced a distance $r_0$ above axis Z—Z of section 61. From geometric considerations, it can be shown that ray $d$ intersects lens 62 a distance $$r = r_0 + f \tan(\beta + \alpha) \quad (2)$$

above axis Z—Z.

The maximum value $r$ can assume is, of course, the lens radius $r_1$. Thus, it is apparent from the above discussion that the design of a bend must include a consideration of the beam size ($r_0$) and the focal length ($f$) of the lens in order to satisfy the requirements of Equation 2 and, thereby, to insure that all of the beam is intercepted by lens 62. Typically, in a wave transmission system the parameters of waveguide 60 are selected for optimum long distance transmission, and will not lend themselves to manipulation for purposes of negotiating a particular bend in the system. This means that the only adjustable parameter is the focal length $f$. While it is also possible to increase $r_1$, this is not always practical as it may make the half-wave section 61 too large. In fact, it is preferred that the size of the beam applied to the half-wave section be reduced as this permits the use of small lenses in the half-wave section.

FIG. 7 shows an arrangement wherein a predesigned half-wave section is matched to a waveguide system by means of a transformer section. For purposes of illustration, a simple one lens matching transformer is shown. However, a more complicated matching section can be used such as is disclosed, for example, in the copending application by H. W. Kogelnik, Ser. No. 438,297, filed Mar. 9, 1965, and assigned to applicant's assignee. To illustrate the principle, the system is shown aligned along a common axis, rather than bent at the pivot points $P_1$ and $P_2$. Nevertheless, the figure illustrates how a small-diameter beam at the input and output ends of the half-wave section 70 is matched to the larger beams in waveguides 71 and 76 by means of transformer lenses 72 and 73, respectively, located between the guides and section 70. In this particular arrangement, the matching lenses are confocally spaced between the waveguide lenses 74 and 75 and the half-wave section, and have focal lengths $f_2$ and $f_4$ given by $$f_2 = \sqrt{f_1 f_3}$$
$$f_4 = \sqrt{f_5 f_3}$$

where $f_1$ is the focal length of lens 74 in guide 71,
$f_5$ is the focal length of lens 75 in guide 76, and
$f_3$ is the focal length of the lenses in the half-wave section.

The use of a matching lens (or lenses) is particularly advantageous in that it permits the design and use of a standard half-wave section throughout a transmission system inasmuch as matching of the section to any part of the transmission system can be independently accomplished by means of separate matching lenses.

In the discussion thus far, the half-wave section has been used as a convenient means of redirecting an optical beam for the purpose of negotiating an intentional bend in a transmission system. FIGS. 8 and 9, now to be described, illustrate the manner in which a half-wave section is used to redirect an optical beam along an essentially straight section of waveguide where the beam has been unintentionally misdirected. For purposes of explanation, misdirection of a beam due to translation and rotation are considered separately. For example, FIG. 8 shows two longitudinally spaced waveguides 80 and 81, coaxially aligned along a common axis G—G, and coupled together by means of a half-wave section 82. The latter is aligned with its axis Z—Z parallel to the guide axis G—G, and is adapted to move transversely relative to the guide axis as indicated by the double arrow 83.

A beam, whose center has been displaced a distance $2d$ relative to the guide axis, is represented by ray $g$ entering section 82. As was explained in connection with FIG. 4, a ray entering a half-wave section displaced to one side of the section axis, is translated an equal distance to the other side of the section axis. Thus, in FIG. 8, the half-wave section 82 is transversely displaced such that its axis Z—Z is located a distance $d$ below axis G—G. Ray $g$, upon traversing section 82, is translated from a distance $d$ below axis Z—Z to a distance $d$ above axis Z—Z, for a total translation of $2d$. This then places ray $g$ on-axis in waveguide 81.

FIG. 9 shows the manner in which a half-wave section is used to correct beam misdirection due to rotation. In this embodiment, as in FIG. 8, there are shown two longitudinally spaced waveguides 90 and 91, coaxially aligned along a common axis G—G, and coupled together by means of a half-wave section 92. The center O of the half-wave section lies along the guide axis G—G, and the half-wave section is adapted to rotate about its center O, as indicated by the double arrow 93.

A beam entering the half-wave section at an angle $2\alpha$ to the axis of guide 90 is represented by a ray $m$. As explained in connection with FIG. 4, a ray that is both displaced relative to the axis of the half-wave section, and inclined at an angle to it, is both translated and rotated by the section. In particular, it is translated an equal distance to the other side of the section axis, and is rotated through twice the incident angle. Accordingly, section 92 is rotated through an angle $\alpha$ relative to axis G—G. So rotated, ray $m$ is inclined at an angle $\alpha$ relative to section axis Z—Z, and displaced a distance $w$ above it. At the output end of section 92, ray $m$, having been rotated through an angle $2\alpha$, and translated a distance $2w$ to the other side of axis Z—Z, is now aligned along guide axis G—G.

In order to handle the general situations in which a ray is both translated and rotated relative to the guide axis, it is apparent that the half-wave section must be capable of independent, simultaneous translation and rotation. In particular, the translation must be along, and the rotation about two mutually orthogonal transverse axes.

FIG. 10 shows an active automatic control system for producing the required translation and rotation in a confocal half-wave section. The half-wave section 99 comprises lenses 100 and 101. A third lens 102, is the first lens following the half-wave section, and would typically be one of the lenses in the matching section.

Information as to the nature of the compensation required is provided by optical sensing elements distributed about the wavepath. These elements monitor the displacement of the optical beam from an axis established by the sensors. Correcting signals, generated in response to the information provided by the sensors are then coupled to suitable control means which effect the necessary change in the beam direction by repositioning the half-wave section. In the embodiment of FIG. 10, two sets of beam-position sensors are employed. The first set, comprising four photosensitive elements 1, 2, 3 and 4, is located at lens 101. The second set, comprising four photosensitive elements 1', 2', 3' and 4', is located at lens 102. The photosensitive elements in both sets of sensors are symmetrically disposed about the wavepath at 90 degree intervals to provide information along two mutually perpendicular directions, designated the $x$ and $y$ directions. Since the beam misdirection can always be resolved into $x$ and $y$ components, and since each of these components can be considered independently of each other, it is only necessary to discuss one of these. However, it is understood that any system would include similar sensing and control means for redirecting the beam along both the $x$ and $y$ directions.

In general, automatic control can be obtained on either a feedforward basis, where a sensor feeds information to control means further along the wavepath, or on a feedback basis, wherein the control means redirects the beam at a position before the beam reaches the sensor. The latter arrangement is a true servo system and can be made as "tight" as desired by increasing the servo loop gain. That is, in a feedback system, the error at the sensors can be made, and automatically maintained, as small as desired. The feedforward system, on the other hand, depends upon a given deflection at the sensors producing a proportionate correction, depending upon the system design. Since everything is predesigned, any subsequent misalignment or drift in gain causes errors which the system is incapable of correcting. Thus, whereas either system can be used equally well to control a half-wave section in accordance with the invention, the feedback system would appear to have practical advantages. Accordingly, a feedback system is depicted in FIG. 10, wherein sensors 1, 2, 3 and 4 feed back through correction signal generators 104 and 105 and lens positioners 106 and 107 and operate upon lens 100, while sensors 1', 2', 3' and 4' feed back through correction signal generators 108 and 109 and lens positioners 110 and 111 and operate upon lens 101.

When the beam is centered, all of the photosensitive elements are equally illuminated by the beam and no net correction signal is generated. Lenses 100 and 101 remain positioned with their centers along guide axis Z—Z. If, however, the beam is misdirected, either because it is propagating at an angle to the guide axis, or because the beam axis is transversely displaced from the guide axis, the photosensitive elements are unequally illuminated. As a result of this imbalance, a net correction signal is generated which is then used to move the controlled lens and, thereby, correct the existing misdirection. Essentially, each sensor controls the preceding lens such that the beam passes through the center of the sensor. For example, FIG. 11 illustrates the operation of the control circuit for a beam whose center is displaced a distance $d$ below the guide axis Z—Z. The beam is represented by a ray $a$. With lenses 100 and 101 located with their centers along the guide axis, ray $a$ traverses the indicated path and emerges from lens 101 parallel to the guide axis but displaced a distance $d$ above the axis, as explained in connection with FIG. 4. However, a beam centered along ray $a$ tends to illuminate photosensitive element 1 to a greater extent than element 3. This difference is converted by the correction signal generator 104 into a correction signal which causes lens positioner 106 to move lens 100 down (indicated by the dotted lens) until the ray is deflected downward sufficiently so as to pass midway between elements 1 and 3 thereby equally illuminating these two elements. This reduces the correction signal to zero and no further displacement of lens 100 is produced. The new direction of ray $a$ is indicated by a ray designated $b$.

As a result of the downward displacement of lens 100, however, the optical axis of the half-wave section is now rotated through some angle with respect to the beam direction. As described with reference to FIG. 4, this produces a rotation in the beam direction equal to twice that angle. As a consequence, ray $b$, emerging from lens 101, is no longer parallel to the guide axis, but is instead directed upward, as indicated in FIG. 11. This causes the beam to illuminate photosensitive element 1' to a greater extent than element 3' which, in turn, causes correction signal generator 108 to activate lens positioner 110 and to reposition lens 101 downward until the beam is again parallel to the guide axis. The repositioned lens 101 is also shown dotted, and the redirected beam center is indicated by ray $c$ along the guide axis.

In this illustration, the incident beam is parallel to the guide axis but is displaced a distance $d$ below the guide axis. Hence, both lenses are moved downward an equal distance $d/2$.

If the incident beam is both displaced and rotated relative to the guide axis, the half-wave section must also be both displaced and rotated in order to redirect the beam along the guide axis. As indicated above, an unequal displacement of the lenses in the half-wave section is equivalent to rotating the axis of the half-wave section. Thus, redirection of a beam that is both displaced and rotated is achieved by the feedback arrangement of FIG. 10 by the unequal displacement of the lenses in the half-wave section in response to the information provided by the two sets of sensors. It is understood that the displacement is in both the $x$ and $y$ directions, as required.

Where the half-wave section includes more than two lenses, a similar control arrangement is used, as illustrated in FIG. 12. As in FIG. 11, a first set of sensors 121 is located adjacent to the last lens 120 of half-wave section 126, and is adapted by means of correction signal generators and lens positioners to control the position of the first lens 123 of section 126. Similarly, a second set of sensors 124 is located adjacent to the next adjacent lens 125, following section 126, and is adapted to control the position of the last lens 120 of section 126.

In order to produce a proportionate displacement of the other lenses in section 126 between lens 123 and lens 120, all the lenses in the section are rigidly connected together by some suitable means, such as rods, or by mounting them all in a common enclosure 127. In this manner, all the lenses are proportionately displaced in response to any displacement at either end of the half-wave section.

FIG. 13 shows an illustrative feedback circuit including a beam position sensor 130, two correction signal generators 131 and 132, and a lens positioner 133.

The four photosensitive elements comprising each sensor can be either photocells or photoresistors, connected in any one of many known ways. Typically, opposite pairs of elements operate together to control the position of the beam along two mutually perpendicular directions. In FIG. 13, each of the four elements 135, 136, 137 and 138 of sensor 130 occupies one quadrant of a circular disc. An aperture 139 at the center of the disc is sufficiently large to permit substantially unimpeded transmission of a properly centered beam. Pairs of leads 141, 142, 143 and 144, connected across each of the respective elements, permit connecting the elements to correction signal generators 131 and 132. (For a description of beam position sensors using refracting or reflecting elements, see the copending application by E. L. Chinnock, Ser. No. 590,380, filed Oct. 28, 1966, and assigned to applicant's assignee.)

Each of the correction signal generators 131 and 132 comprises a balanced amplifier whose input end is connected to one pair of photosensitive elements of beam position sensor 130. Thus, in the illustrative embodiment of FIG. 13, the input end of balanced amplifier 145, in the $x$-direction correction signal generator, is connected to the $x$-direction sensor elements 135 and 137, and the input end of balanced amplifier 146, in the $y$-direction correction signal generator, is connected to the $y$-direction sensor elements 136 and 138.

The output ends of each of the balanced amplifiers are connected to a pair of coils 150, 151 or 152, 153, respectively, in the lens positioner.

The control signals generated by the correction signal generates, in response to the illumination upon the photosensitive elements in the beam position sensor, are used to operate the lens positioner which is adapted to move the controlled lens in both the $x$ and $y$ directions. Since the lens movement is typically of the order of 0.001 inch, a low friction mechanical arrangement, such as is illustrated in FIG. 13, is advantageously employed. In this embodiment of a lens positioner, the lens movement is magnetically controlled by means of the currents fed to four magnets arranged in a magnetic circuit such that unbalanced currents create a net radial force, and a corresponding displacement of the lens in the desired direction.

Referring more particularly to the illustrated embodiment, the controlled lens 160 is mounted in an aperture at the center of a lens holder 161. The holder is provided with four soft iron armatures 162, 163, 164 and 165, located at the ends of four radially extending arms symmetrically disposed about lens 160 at 90 degree intervals. The armatures are positioned in the air gap between the outer cores, respectively, of four E-shaped magnets 170, 171, 172 and 173, and provide low reluctance flux return paths between the outer cores and the inner core of the respective magnets. The inner core of each of the magnets is magnetized by one of the coils 150, 151, 152 or 153, respectively, in response to the currents provided by the correction signal generators.

The lens holder is supported in position by the action of the magnets and by means of flexible supports 180, 181, 182 and 183 which contact opposite sides of the respective holder arms.

In all cases it is understood that the above-described arrangements are illustrative of but a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. A long distance optical beam waveguide including a plurality of adjustable beam redirectors;

a different one of said redirectors being located at spaced intervals between adjacent sections of said waveguide for redirecting an optical beam propagating therealong;

each of said redirectors comprising a separate group of $n$ identical lenses of focal length $f$, symmetrically disposed with respect to the center of said redirector with their centers located along a common axis;

characterized in that:

the center-to-center spacing L between lenses is such that $$n\left[\cos^{-1}\left(1-\frac{L}{2f}\right)\right]=\pi$$

and the overall length of said redirector is $n$L;

automatic control means associated with each of said redirectors comprising:

sensing means disposed along said waveguide for monitoring the orientation of said beam;

means associated with said sensing means for generating correcting signals whenever said beam orientation deviates from a given preferred orientation;

and means responsive to said correcting signals for independently translating said redirector in a direction perpendicular to a transverse axis through the center of said redirector and for independently rotating said redirector about said axis.

2. The redirector according to claim 1 wherein $L=2f$.

3. In combination:

an optical beam waveguide;

a beam redirector disposed between adjacent sections of said waveguide for redirecting a beam propagating therealong;

said redirector comprising a separate group of $n$ identical lenses of focal length $f$, symmetrically disposed with respect to the center of said redirector with their centers located along a common axis;

characterized in that:

the center-to-center spacing L between lenses is such that $$n\left[\cos^{-1}\left(1-\frac{L}{2f}\right)\right]=\pi$$

and the overall length of said redirector is $n$L;

and means for independently translating said redirector in a direction perpendicular to a transverse axis through the center of said redirector and for independently rotating said redirector about said axis.

4. In combination:

first and second optical waveguides oriented with their longitudinal axes at an angle $2\alpha$ with respect to each other, where $\alpha$ is an arbitrary angle;

and means for directing an optical beam between said guides;

characterized in that:

said means is a half-wave section comprising $n$ identical lenses of focal length $f$, spaced apart a distance L, such that $$n\left[\cos^{-1}\left(1-\frac{L}{2f}\right)\right]=\pi$$

and in that the axis of said section intersects each of said longitudinal axes at an angle $\alpha$ at a distance $L/2$ from the first and last of said lenses, respectively.

5. The combination according to claim 4, including means for pivoting said waveguides relative to said half-wave section.

6. The arrangement according to claim 3 wherein the diameter of said waveguide is larger than the diameter of said half-wave section;

and wherein means are provided for matching between said waveguide and said section.

7. The arrangement according to claim 3 wherein said control means includes a lens positioner comprising:

a lens holder having four radial arms symmetrically extending thereabout at 90 degree intervals;

a magnetic armature located at the end of each arm;

magnetic means for exerting a radial force on each of said armatures;

and means for varying said force whereby movement of said holder is produced along two mutually perpendicular directions.

References Cited

UNITED STATES PATENTS

| | | | |
|---|---|---|---|
| 2,651,715 | 9/1953 | Hines | 350—54 X |
| 2,922,894 | 1/1960 | Kerr et al. | 350—6 |
| 3,016,785 | 1/1962 | Kapany | 350—247 |
| 3,200,697 | 8/1965 | Goubau. | |
| 3,326,620 | 6/1967 | Marie. | |
| 3,316,800 | 5/1967 | Kibler | 250—201 X |
| 3,382,022 | 5/1968 | Fox | 350—54 |

OTHER REFERENCES

Hirand, et al.: "Stability of a Beam in a Beam Waveguide," Proceedings of the IEEE, vol. 52, No. 11, November 1964.

Miller: "Directional Control in Light-wave Guidance," The Bell Technical Journal, vol. XLIII, No. 4, Part 2, July 1964.

DAVID SCHONBERG, Primary Examiner

PAUL R. GILLIAM, Assistant Examiner